Figure 1:
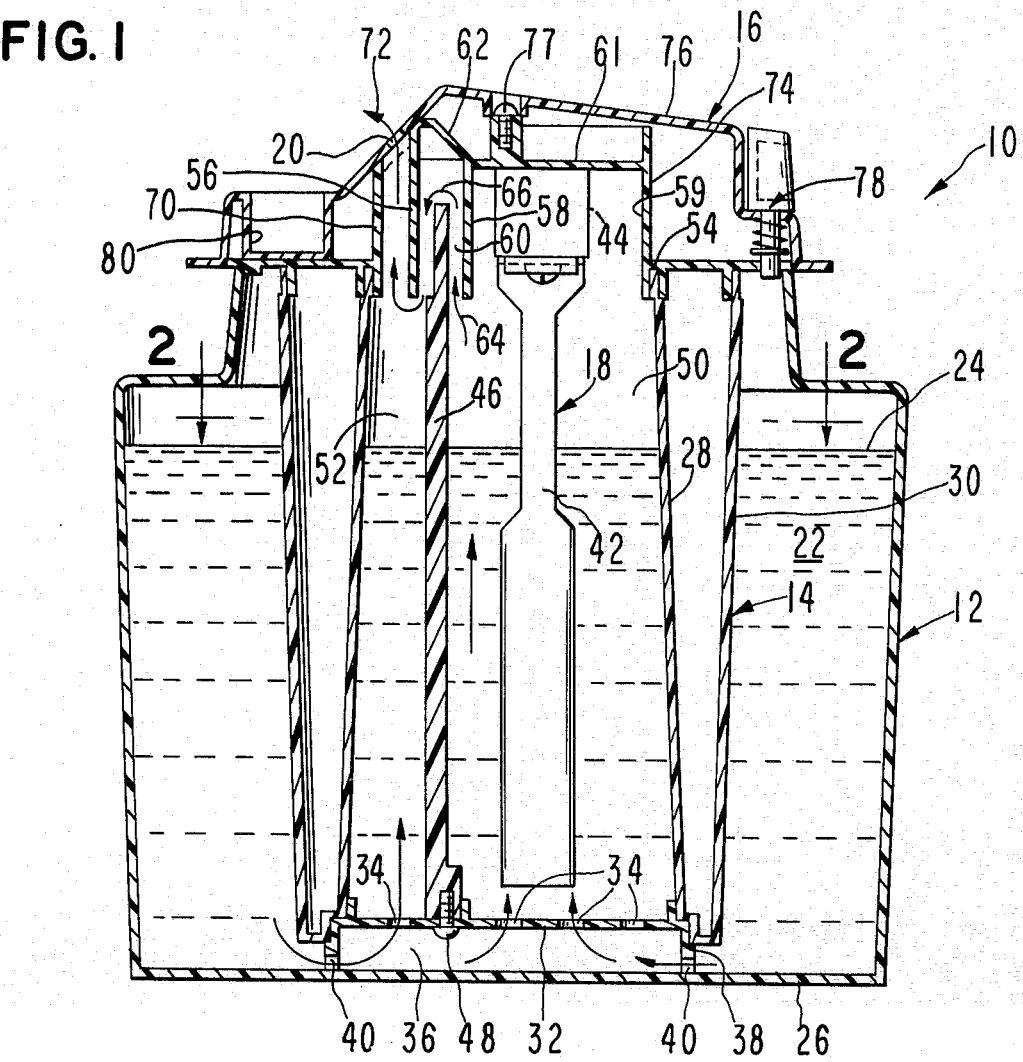

United States Patent [19]
Myklebust

[11] 3,971,913
[45] July 27, 1976

[54] NON-SPLITTING ELECTRIC ROOM VAPORIZER

[75] Inventor: Paal Myklebust, Baraboo, Wis.

[73] Assignee: Gerber Products Company, Fremont, Mich.

[22] Filed: July 26, 1974

[21] Appl. No.: 491,971

[52] U.S. Cl. .............................. 219/284; 21/119; 128/192; 219/275; 219/314; 239/136; 261/142

[51] Int. Cl.² ..................... H05B 3/60; A61L 9/02; F22B 1/30

[58] Field of Search ........................ 219/271–276, 219/284–295, 362, 314; 21/117–119; 128/186, 187, 192, 193; 261/142; 239/136, 135

[56] References Cited
UNITED STATES PATENTS

| | | | |
|---|---|---|---|
| 1,711,793 | 5/1929 | Kenney | 128/192 UX |
| 1,949,778 | 3/1934 | Brown et al. | 219/276 |
| 1,981,765 | 11/1934 | Weiss | 219/292 X |
| 2,763,765 | 9/1956 | Duberstein et al. | 219/275 |
| 2,810,167 | 10/1957 | Parks | 219/288 UX |
| 2,843,891 | 7/1958 | Fisher | 219/293 UX |
| 3,098,926 | 7/1963 | Katzman | 219/275 |
| 3,485,065 | 12/1969 | Frank | 68/222 |
| 3,659,078 | 4/1972 | Rudstrom | 219/275 X |
| 3,714,391 | 1/1973 | Katzman | 219/288 X |
| 3,714,392 | 1/1973 | Katzman | 219/271 X |

*Primary Examiner*—A. Bartis
*Attorney, Agent, or Firm*—Townsend and Townsend

[57] ABSTRACT

An improved vaporizer for directing water vapor into the air without causing foaming or accumulation of water at the exit orifice. A relatively large receptacle contains a subhousing consisting of two separated chambers. A first chamber, having electrode means therein for generating steam forming the water vapor and a second chamber are separated by partitions defining a serpentine path with an inverted U-shape configuration. The orifice communicates with the downstream end of the path. The steam after being generated flows along the serpentine path by rising in the first chamber, passing over the top of the partition and downwardly into the second chamber, then moving upwardly toward and through an exit orifice into the surrounding environment. During the downward portion of its path of travel, the relatively large water particles separate from the water vapor by gravity and return to the second chamber, the latter being in fluid communication at its bottom with the first chamber. The subhousing has a perforate bottom and supporting means with passages to the outer portions of the receptacle for making fluid communication between the receptacle and the steam generating chamber. The steam generating region is isolated from the major portion of the vaporizer itself, thereby minimizing the energy required to generate the steam, yet such region is in fluid communication with such major portions at all times to assure an adequate supply of water to such regions.

4 Claims, 2 Drawing Figures

U.S. Patent  July 27, 1976  3,971,913

NON-SPLITTING ELECTRIC ROOM VAPORIZER

This invention relates to improvements in room vaporizers and, more particularly, to a vaporizer which emits water vapor into the air without causing foaming or accumulation of water at the exit orifice of the vaporizer.

BACKGROUND OF THE DISCLOSURE

Conventional room vaporizers have a common drawback in that they all cause a foaming or "spitting" action at their exit orifices. This foaming action is due to the fact that the vapor issuing from the vaporizer through the exit orifice carries water particles which have not been vaporized, i.e., are of a relatively large size compared with the size of the particles of the vapor. This foaming action oftentimes inhibits the proper travel of the water vapor through and outwardly of the orifice and causes a build-up of water directly below the orifice itself. By eliminating the relatively large water particles from the vapor before it approaches the orifice, the aforesaid foaming action and water accumulation can be circumvented to thereby assure more efficient operation of the vaporizer itself.

SUMMARY OF THE INVENTION

The present invention is directed to an improved room vaporizer having structure therewithin for defining a serpentine path for the flow of water vapor toward the exit orifice thereof. By flowing along such path, water vapor is separated from relatively large water particles because, during downward movement along the path, the relatively large water particles fall by gravity and are thereby separated from the water vapor as the latter moves upwardly toward the orifice itself.

The structure defining such path includes a vertical, primary partition within a subhousing in the vaporizer, and a pair of vertical, secondary partitions extending downwardly from the top of the subhousing. The secondary partitions are relatively short in length and extend to a location below the top of the primary housing. Thus, the serpentine path has an inverted, U-shaped configuration and the orifice of the vaporizer communicates with the downstream end of the path.

As the water vapor flows along the path, relatively large water particles carried in the water vapor are stripped therefrom and fall by gravity as the water vapor passes downwardly at the downstream segment of the inverted, U-shaped path. This, therefore, allows the water vapor, freed of relatively large water particles, to pass upwardly toward and through the orifice. Because of the absence of such water particles, the water vapor flows unobstructedly through the orifice and is not inhibited by the foaming or "spitting" action which oftentimes occurs with the use of conventional room vaporizers. The relatively large water particles stripped from the water vapor fall into the supply of water in the subhousing.

The vaporizer includes a relatively large receptacle in which the subhousing is disposed. The receptacle contains the supply of water to be heated in the subhousing by electrodes in a steam-generating chamber thereof. The subhousing has improved means at the bottom thereof for making fluid communication between the receptacle and the steam-generating chamber. Only the water in the steam-generating chamber is heated sufficiently to generate the steam. The water in the receptacle is not heated, thereby minimizing the energy required to generate the heat.

The primary object of this invention is to provide an improved room vaporizer which operates to emit water vapor free of relatively large water particles to thereby eliminate the foaming or "spitting" action which occurs at the orifice of a conventional room vaporizer.

Another object of this invention is to provide an improved room vaporizer of the type described, wherein steam generated within the vaporizer is caused to flow along a serpentine path having a downwardly extending segment so that, when the steam or water vapor flows along such segment, relatively large water particles are separated by gravity from the water vapor itself so that the water vapor flows upwardly and toward the orifice of the vaporizer freed of the relatively large particles to thereby assure the absence of foaming or "spitting" at the orifice which would otherwise inhibit the flow of water vapor therethrough.

Another object of this invention is to provide a room vaporizer of the aforesaid character wherein the vaporizer has means for isolating a steam-generating region from the major portion of the vaporizer itself yet such region is in fluid communication with such major portion at all times to thereby minimize the energy requirements for steam generation to assure an adequate supply of water to such region.

Other objects of this invention will become apparent as the following specification progresses, reference being had to the accompanying drawing for an illustration of the invention.

Figure 2:
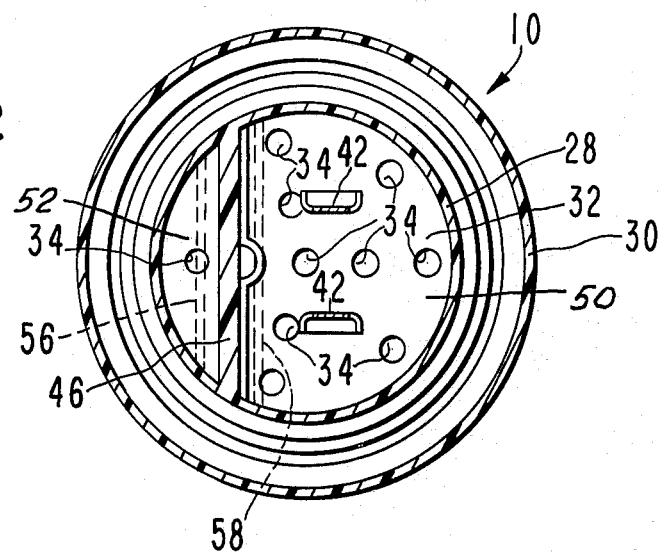

In the drawing:

FIG. 1 is a vertical section through a room vaporizer utilizing the teachings of the present invention; and FIG. 2 is a cross-sectional view taken along line 2—2 of FIG. 1.

The vaporizer of this invention is broadly denoted by the numeral 10 and includes an open top receptacle 12, a subhousing 14 removably mounted within receptacle 12, a top member 16 for covering the open top of the receptacle and the open top of subhousing 14, and electrode means 18 coupled with subhousing 14 and extending into subhousing 14 for heating the water therewithin to form steam or water vapor. All of the foregoing elements are generally common in conventional room vaporizers. The subject matter rendering vaporizer 10 inventive over such vaporizers includes partition means hereinafter described for forming a serpentine path for water vapor extending from the interior of one region or chamber of subhousing 14 to an exit orifice 20 formed in top member 16.

Receptacle 12 is adapted to contain water denoted by the numeral 22, the upper level of the water being denoted by the numeral 24. Receptacle 12 is, for purposes of illustration, transversely circular; however, it can have other configurations as well.

Subhousing 14 is removably supported on the bottom 26 of receptacle 12 and has a generally cylindrical inner wall 28 and a generally cylindrical outer wall 30 surrounding and spaced from wall 28. The space between walls 28 and 30 is adapted to contain only ambient air which serves to insulate the water contained within wall 28 from the water surrounding wall 30.

Subhousing 14 also includes a perforate bottom 32 having holes 34 therethrough for placing the region within wall 28 in fluid communication with a space 36 below bottom 32. A continuous circular flange 38 is integral with bottom 32 and depends from the outer periphery thereof. Flange 38 has a pair of relatively small fluid passages 40 therethrough, the passages being diametrically opposed to each other. Passages 40 are the only means by which water in the receptacle surrounding wall 30 can get into space 36 and thereby into the region surrounded by wall 28. Thus, the water within wall 28 is effectively out of substantial heat exchange relationship to the water in receptacle 12 surrounding wall 30 because of the insulating air layer in the space between walls 28 and 30. Thus, heat energy applied to the water within wall 28 is not transferred to any appreciable extent by conduction or radiation to the water surrounding wall 30. In this matter, only a relatively small amount of heat energy is required to heat the water within wall 28.

Electrode means 18 includes a pair of spaced electrodes 42 (FIG. 2) which extend downwardly from an insulating boss 44 forming a part of subhousing 14. Voltage applied to the electrodes from an external power source causes a current flow through the electrodes and the current flow heats the water in contact with the electrodes sufficiently to create steam or water vapor under pressure.

A first, generally upright partition 46 spans the distance across the space surrounded by wall 28 as shown in FIG. 2 and is bonded to or integral with wall 28 to divide the interior thereof into two chambers 50 and 52. Electrodes 42 are disposed in chamber 50 as shown in FIG. 2. Bottom 32 is mounted by screw 48 to partition 46 and seats in a peripheral shoulder formed in wall 28. Each chamber communicates with space 36 therebelow by way of one or more holes 34 through bottom 32.

Partition 46 extends above the upper extremity 54 of wall 28. The upper end of partition 46 cooperates with a pair of spaced, parallel second partitions 56 and 58 carried by subhousing 14 in a cylindrical recess 59 in which boss 44 is disposed. Partitions 56 and 58 span the distance across the recess and depend from a web 61 forming a part of top member 15. As shown in FIG. 1, partitions 46, 56 and 58 define an inverted, U-shaped fluid passage 60 which communicates with the upper ends of chambers 50 and 52. The upper end of passage 60 is closed by a web 62 integral with web 61; thus, steam or water vapor under pressure generated in chamber 50 passes upwardly in the direction of arrow 64, then changes direction by 180° as denoted by arrow 66, then passes downwardly between partitions 46 and 56. Then the water vapor again changes direction by 180° as denoted by arrow 68 and passes upwardly between partition 56 and a third partition 70 spaced therefrom and integral with subhousing 14, and flows toward and through orifice 20 as denoted by the arrow 72.

The essence of the present invention is the stripping or separating of relatively large water particles from the water vapor as the latter flows along the serpentine path represented by arrows 64, 66 and 68. As the water vapor flows downwardly between partitions 46 and 56, the relatively large particles separate from the water vapor by gravity and drop into the water in chamber 52. The water vapor, freed of such relatively large particles, then passes upwardly and through orifice 20. Because of the absence of the relatively large water particles in the flow of water vapor through the orifice, no foaming or "spitting" of water particles at such orifice occurs.

Top member 16 can be of any suitable construction. For purposes of illustration, it is comprised of a first, lower portion 74 having boss 44 and partitions 56 and 58 integral therewith, and a second upper portion 76 disposed over portion 74 and connected thereto by a screw 77. Portion 76 has a plunger mechanism 78 associated therewith for releasably connecting the same to receptacle 12. Also, upper portion 76 has a cup-like depression 80 below and in alignment with orifice 20 for receiving and dispensing a vaporizable medication.

In operation, water is added to receptacle 12 when subhousing 14 is separated therefrom. Then the subhousing is placed in the receptacle and top member 16 is moved into covering relationship to the open top of the receptacle as shown in FIG. 1. Water in the receptacle will immediately flow into space 36 through fluid passages 40 and flange 38. The water in space 36 will then rise in chambers 50 and 52 until the water in these chambers has a level common with that of the water in the area surrounding wall 30.

With electrodes 42 in chamber 50, a voltage is applied by means of an electrical cord (not shown) coupled to an electrical power outlet, whereupon the water in chamber 50 is heated to the boiling point to form steam. The steam or water vapor then flows upwardly and along the serpentine path represented by arrows 64, 66 and 68, and then passes upwardly through orifice 20 and exits into the air to moisturize the same. As the water vapor flows downwardly and beneath partition 56, relatively large water particles are separated from the water vapor by gravity and such water particles fall back into the water in chamber 52.

The foregoing operation continues so long as water is in chamber 50 to a sufficient level to cause generation of steam by the heat developed by the electrical current through electrodes 42. Also, water continues to flow into chambers 50 and 52 so long as water is present in receptacle 12. In addition, top member 16 can be assembled and connected to subhousing 14 with the use of heat-fitted pins (not shown) rather than metal screws and the like to facilitate assembly and to minimize maintenance of the vaporizer.

I claim:

1. A vaporizer comprising: an open top receptacle adapted to receive water to be vaporized to steam; a subhousing having a perforate bottom and removably disposed in said receptacle, said subhousing being provided with a top member for closing the top of the receptacle when the subhousing is disposed therewithin; a continuous, first, upright partition in said subhousing extending from the bottom thereof to near but spaced relation to said top member for dividing said subhousing into a first and a second chamber;

said first chamber being in communication with the receptacle through the perforate bottom of said subhousing; electrode means carried by said top member and extending into said first chamber for vaporizing water; second and third generally parallel partitions secured to and extending downwardly from said top member into respective ones of said first and second chambers on opposite sides of and spaced from said first partition and said subhousing bottom, said top member having an orifice in fluid connection with said second chamber at a location spaced from said third partition, each said second and third partition being of a length sufficient to provide, in combination with said first partition, a serpentine path from the electrodes in said first chamber to the orifice in said second chamber, whereby any steam generated in said first chamber must flow along said serpentine path toward said orifice, thereby tending to be freed of any entrapped water particles prior to egress from said orifice.

2. A vaporizer in accordance with claim 1 and further characterized by means for supporting said perforate bottom of said subhousing and defining a jointly accessible space thereunder for placing said first and second chambers in fluid communication with the portion of the receptacle surrounding the subhousing.

3. A vaporizer as set forth in claim 2 wherein said supporting means includes a continuous flange having a passage therethrough, the flange being integral with said bottom and depending from the outer periphery thereof and removably supported by the bottom of the receptacle.

4. A vaporizer as set forth in claim 2 wherein the length of said second and third partitions is a number of times less than the length of the first partition.

* * * * *

UNITED STATES PATENT AND TRADEMARK OFFICE
CERTIFICATE OF CORRECTION

PATENT NO. : 3,971,913
DATED : July 27, 1976
INVENTOR(S) : Paal Myklebust

It is certified that error appears in the above–identified patent and that said Letters Patent are hereby corrected as shown below:

The title on the cover sheet (item [54]) and at column 1, line 1, should read as follows:

NON-SPITTING ELECTRIC ROOM VAPORIZER

Signed and Sealed this

Third Day of May 1977

[SEAL]

Attest:

RUTH C. MASON
Attesting Officer

C. MARSHALL DANN
Commissioner of Patents and Trademarks